US007018569B2

(12) United States Patent
Takai

(10) Patent No.: US 7,018,569 B2
(45) Date of Patent: Mar. 28, 2006

(54) COMPLEX OXIDE FINE PARTICLES, PARTICULATE MIXTURE, AND CONDUCTIVE PASTE

(75) Inventor: Yasushi Takai, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 24 days.

(21) Appl. No.: 10/795,405

(22) Filed: Mar. 9, 2004

(65) Prior Publication Data

US 2004/0188657 A1    Sep. 30, 2004

(30) Foreign Application Priority Data

Mar. 10, 2003    (JP)    ............... 2003-062755

(51) Int. Cl.
*H01B 1/08*    (2006.01)
(52) U.S. Cl. ............... 252/521.1; 252/520.21
(58) Field of Classification Search ............... 501/126, 501/134, 135; 252/520.21, 521.1; 428/402
See application file for complete search history.

(56) References Cited

U.S. PATENT DOCUMENTS 5,082,811 A * 1/1992 Bruno ............... 501/134
6,060,420 A * 5/2000 Munakata et al. ............... 502/302

FOREIGN PATENT DOCUMENTS

| JP | 04154617 A2 * | 5/1992 |
| JP | 2945644 B2 | 6/1999 |
| JP | 292270 B2 | 10/1999 |
| JP | 2002-302701 A | 10/2002 |

OTHER PUBLICATIONS

Hayashi et al "Preparation of barium strontium titanates . . . ", Ceramic Transactions 1998, 88, pp 177-182 (Abstract).*

* cited by examiner

*Primary Examiner*—Mark Kopec
(74) *Attorney, Agent, or Firm*—Birch, Stewart, Kolasch & Birch, LLP

(57) ABSTRACT

Fine particles of complex oxide represented by formula: $ABO_3$ wherein A is at least two elements selected from among alkaline earth metal elements and rare earth elements and B is at least one metal selected from among Ti, Mn, Nb and Zr, have a BET specific surface area of 20–70 $m^2/g$ and a DSC endothermic quantity of up to 20 mcal/g. The shrinkage behavior problem of internal electrode layers during firing is solved when the complex oxide fine particles or a mixture thereof with nickel particles is used as an electrode material for the internal electrode layers.

11 Claims, 9 Drawing Sheets

EXAMPLE 2

EXAMPLE 6

COMPARATIVE EXAMPLE 1

SYNTHESIS EXAMPLE 1

EXAMPLE 11

200nm

COMPARATIVE EXAMPLE 2

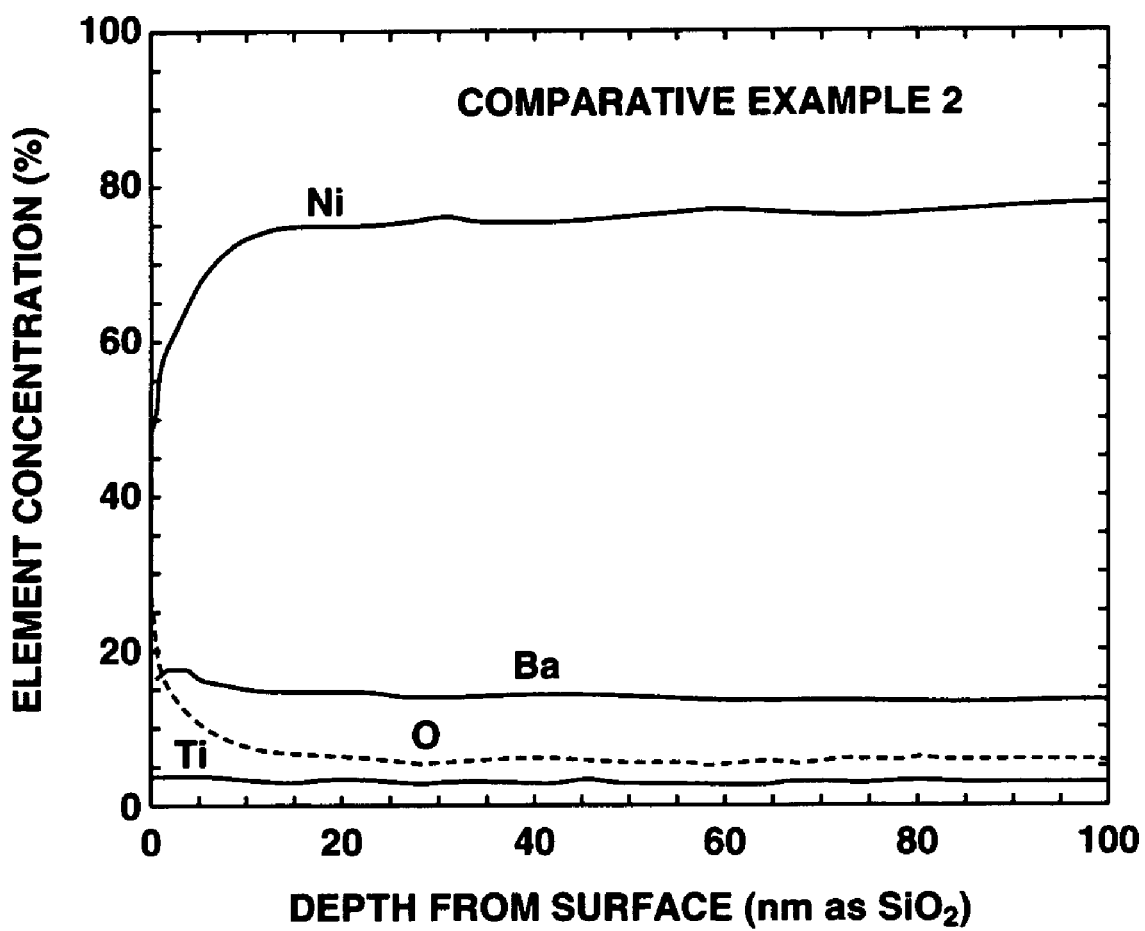

COMPLEX OXIDE FINE PARTICLES, PARTICULATE MIXTURE, AND CONDUCTIVE PASTE

This Non-provisional application claims priority under 35 U.S.C. § 119(a) on Patent Application No(s). 2003-062755 filed in Japan on Mar. 10, 2003, the entire contents of which are hereby incorporated by reference.

BACKGROUND OF THE INVENTION

1. Technical Field

This invention relates to complex oxide fine particles represented by the general formula: $ABO_3$ wherein A is at least two elements selected from among alkaline earth metal elements and rare earth elements and B is at least one metal selected from among Ti, Mn, Nb and Zr; a particulate mixture of the complex oxide fine particles and nickel particles; and a conductive paste using the mixture.

2. Background Art

In unison with the recent demand to reduce the size of portable equipment and digital home appliances, studies have been made on multilayer ceramic capacitors to reduce their size and to increase their capacitance. For the size reduction and capacitance increase of multilayer ceramic capacitors, it is most effective to establish a multilayer structure by reducing the thickness of dielectric layers and internal electrode layers. For reducing the thickness of internal electrode layers, metal particles in a conductive paste from which the internal electrode layers are formed must be made finer. Among the currently available internal electrode layers, the thinnest layers are of the order of 1 micron (μm), and made of a conductive paste containing metal particles which are composed of a single metal such as nickel, silver, palladium or the like and have an average particle diameter of about 0.2 to 0.5 micron. Engineers are making efforts to develop the technology capable of forming internal electrode layers as thin as about 0.5 micron. To this end, it is believed that the metal particles in conductive paste must have an average particle diameter of 0.2 micron or less.

However, as metal particles become finer, their incipient shrinkage temperature becomes lower and their shrinkage characteristics become greater. It is considered problematic that when multilayer ceramic capacitors are sintered, cracks and other defects develop due to differential thermal shrinkage, especially a difference in incipient shrinkage temperature, between internal electrode layers composed mainly of nickel metal and dielectric layers composed mainly of ceramics such as $BaTiO_3$. A number of proposals have been made to overcome this problem.

More particularly, finer metal particles have a larger surface area and a lower incipient shrinkage temperature. For example, internal electrode layers composed mainly of nickel metal start shrinkage from a temperature of about 600° C. On the other hand, dielectric layers composed mainly of ceramics such as $BaTiO_3$ start shrinkage from a temperature of about 900° C. Then at the temperature of about 600° C. at which internal electrode layers start shrinkage, the binder in dielectric layers has already been burned out so that the dielectric layers are weak (low strength) and susceptible to defects such as cracks by the shrinkage of internal electrode layers.

One known attempt to elevate the incipient shrinkage temperature or to restrain the shrinkage factor of internal electrode layers is by adding to nickel metal particles an oxide having little impact on dielectric properties. For instance, it was proposed to add magnesium and/or calcium (see Japanese Patent No. 2,945,644) or rare earth oxides such as $Y_2O_3$ or $BaTiO_3$ (see Japanese Patent No. 2,992,270). Both the proposals are successful in elevating the incipient shrinkage temperature of internal electrode layers, but to a less extent. The same assignee as the present invention proposed particles in which core particles made of a high melting point nickel alloy are covered with an oxide (JP-A 2002-302701).

SUMMARY OF THE INVENTION

An object of the invention is to provide complex oxide fine particles, a particulate mixture and a conductive paste, which are useful as an electrode material capable of solving the problem of differential shrinkage behavior between internal electrode layers and dielectric layers.

We have found that the problem of differential shrinkage behavior between internal electrode layers and dielectric layers is solved by admixing 5 to 30% by weight of complex oxide fine particles represented by the general formula: $ABO_3$ wherein A is at least two elements selected from among alkaline earth metal elements and rare earth elements and B is at least one metal selected from among Ti, Mn, Nb and Zr, and having a BET specific surface area of 20 to 70 $m^2/g$ and a DSC endothermic quantity of up to 20 mcal/g with nickel particles having surfaces which are at least partially coated with nickel oxide. Better results are obtained when they are admixed such that on XPS analysis, the concentration of element A at a depth of 5 nm from the surface is at least twice the concentration of element A at a depth of 100 nm from the surface.

In a first aspect, the invention provides fine particles of complex oxide represented by the general formula: $ABO_3$ wherein A is at least two elements selected from alkaline earth metal elements and rare earth elements and B is at least one metal selected from the group consisting of Ti, Mn, Nb and Zr. The complex oxide fine particles should have a BET specific surface area of 20 to 70 $m^2/g$ and a differential scanning calorimetry (DSC) endothermic quantity of up to 20 mcal/g. Preferably the complex oxide fine particles have an average particle diameter $D_{50}$ of up to 0.08 μm as measured by laser diffraction.

In a second aspect, the invention provides a particulate mixture comprising nickel particles having surfaces which are at least partially coated with nickel oxide and having a particle size distribution of 0.05 to 1.0 μm and 5 to 30% by weight, based on the mixture, of the complex oxide fine particles which are uniformly admixed with the nickel particles so as to cover at least partially the nickel particle surfaces. The particulate mixture may further comprise 0.01 to 10% by weight, based on the mixture, of silver particles having a particle size distribution of up to 0.5 μm. In a preferred embodiment, the nickel particles are admixed and covered with the complex oxide fine particles such that when the particulate mixture is analyzed by x-ray photoelectron spectroscopy (XPS), the concentration of element A at a depth of 5 nm from the surface is at least twice the concentration of element A at a depth of 100 nm from the surface. In another preferred embodiment, provided that the nickel particles and the complex oxide fine particles have an average particle diameter d and D, respectively, when observed under a transmission electron microscope, the ratio D/d is in a range between 0.001 and 0.3.

In a third aspect, the invention provides an electroconductive paste comprising the particulate mixture of the second aspect and an organic vehicle.

BRIEF DESCRIPTION OF THE DRAWINGS

FIG. 9 is a concentration profile of the particulate mixture of Comparative Example 2 as analyzed depthwise by XPS.

DESCRIPTION OF THE PREFERRED EMBODIMENT

Complex Oxide Fine Particles

Figure 1:
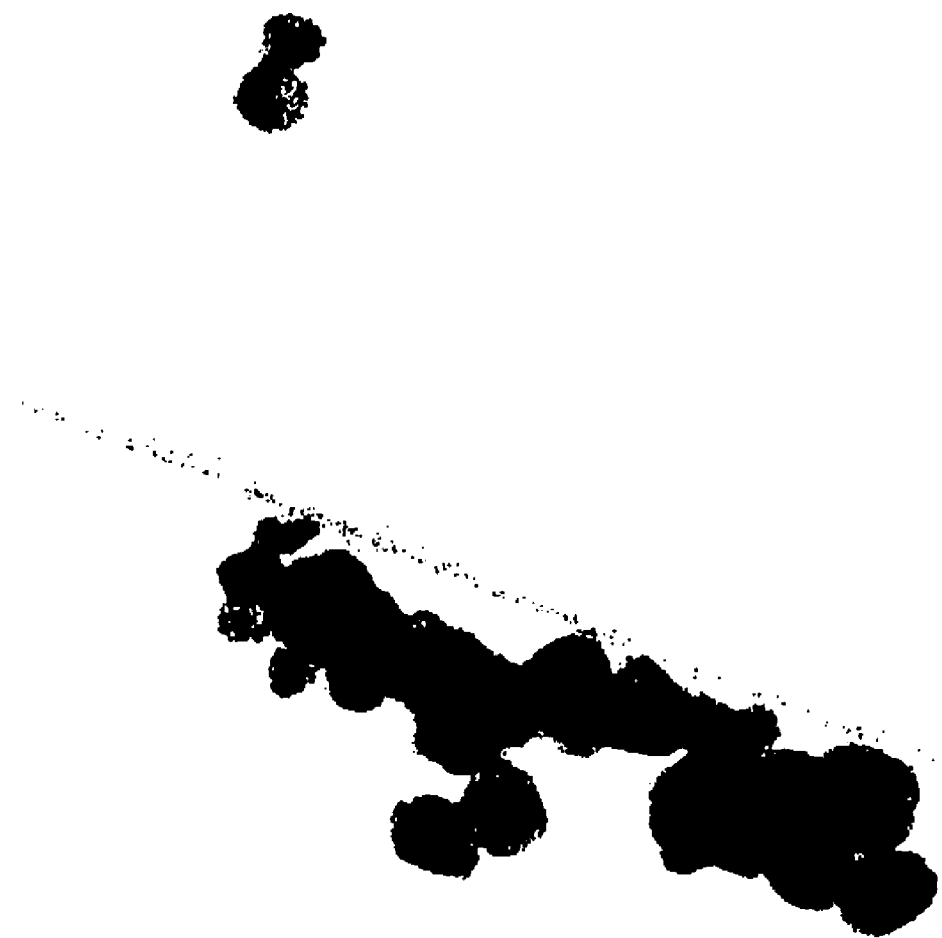
FIG. 1 is a photomicrograph of complex oxide fine particles of Example 2.

The complex oxide fine particles of the invention are represented by the general formula: $ABO_3$ wherein A is at least two elements selected from among alkaline earth metal elements and rare earth elements and B is at least one metal selected from among Ti, Mn, Nb and Zr, and characterized by a BET specific surface area of from 20 $m^2/g$ to 70 $m^2/g$ and a DSC endothermic quantity of up to 20 mcal/g.

In the formula, A is at least two elements selected from among alkaline earth metal elements including Sr, Ca, Mg and Ba and rare earth elements including Y and La through Lu, and preferably a combination of Ba and Sr or a combination of Ba, Sr and a rare earth element. B is at least one metal selected from among Ti, Mn, Nb and Zr. When electronic parts such as ceramic capacitors are manufactured, they are typically fired in an inert or weakly reducing atmosphere in order to prevent oxidation of nickel. However, firing in an inert or weakly reducing atmosphere is undesirable for dielectric material. To prevent reduction of dielectric material, RE (rare earth), Mg, Mn or the like is preferably added thereto. Similarly, RE, Mg, Mn or the like is preferably added to a complex oxide to be added to electrode material in order that the complex oxide be resistant to reduction. Accordingly, a complex oxide (Ba.RE) (Ti.Zr.Mn)$O_3$ is desired.

In general, $BaTiO_3$ having a BET specific surface area of 10 to 20 $m^2/g$ is used as an additive to electrode material. The complex oxide fine particles of the invention have a BET specific surface area of at least 20 $m^2/g$, especially from more than 20 $m^2/g$ to 70 $m^2/g$ and preferably from 25 $m^2/g$ to 50 $m^2/g$. The BET specific surface area as used herein corresponds to the diameter of primary particles. When calculated on the assumption that primary particles are spherical, a surface area of 20 $m^2/g$ corresponds to a primary particle diameter of about 0.025 μm, a surface area of 70 $m^2/g$ corresponds to a primary particle diameter of about 0.007 μm, a surface area of 25 $m^2/g$ corresponds to a primary particle diameter of about 0.02 μm, and a surface area of 50 $m^2/g$ corresponds to a primary particle diameter of about 0.001 μm. Upon photomicrograph observation under transmission electron microscope (TEM), the primary particle diameter is in the range from 0.001 μm to 0.08 μm, indicating that primary particles constitute single particles.

The complex oxide fine particles of the invention have an endothermic quantity of up to 20 mcal/g, preferably up to 15 mcal/g, as determined by differential scanning calorimetry (DSC) at low temperatures (120–140° C.). If the DSC endothermic quantity is more than 20 mcal/g, endothermic reaction can impede firing. The DSC endothermic quantity is adjusted to or below 20 mcal/g by having the crystalline structure take a cubic or pseudo-cubic system.

It is understood that complex oxide fine particles having a large BET specific surface area are primary particles of a smaller size. It is preferred that primary particles have a small size and a sufficiently weak cohesive force to readily disperse to discrete particles. An average particle diameter $D_{50}$ is often used as the measure of ease of dispersion. Specifically, when 0.2 g of oxide powder is added to 50 ml of 0.1 wt % sodium hexametaphosphate solution and ultrasonic dispersion effected at 40 W for 1 to 5 minutes, the oxide powder is disintegrated to such an extent that the average particle diameter $D_{50}$ so measured by the laser diffraction method (SALD-7000 by Shimadzu Mfg. Co., Ltd., refractive index 2.40–0.05) is close to the primary particle diameter. Preferably, $D_{50}$ is equal to or less than 0.08 μm.

The method of preparing complex oxide fine particles as defined above involves adding an alkali solution (e.g., aqueous ammonia) to an aqueous solution containing in admixture a water-soluble salt of an alkaline earth metal and/or a water-soluble salt of a rare earth element and a water-soluble salt of one or more metals of Ti, Mn, Nb and Zr, forming hydroxides of the metals and allowing them to precipitate, dispersing the precipitate in a dilute acid solution such as nitric acid or hydrochloric acid to form a slurry, preferably adding barium hydroxide thereto, and heating the slurry at a temperature of 130 to 200° C., thereby forming a complex oxide of the general formula: $ABO_3$. The water-soluble salts of metals are typically chlorides and nitrates, though not limited thereto.

Particulate Mixture

The particulate mixture of the invention is arrived at by uniformly admixing the complex oxide fine particles as defined above with nickel particles whose surface is at least partially coated with nickel oxide, such that the nickel particle surface is at least partially covered with the complex oxide fine particles.

The nickel particles should have a particle size distribution of 0.05 to 1.0 μm. In order to reduce the thickness of electrode layers from the current level of 1 to 1.2 μm to a desired level of 0.5 to 0.8 μm, the maximum particle diameter is desirably equal to or less than about one half of the thickness of electrode layers and especially equal to or less than 0.5 μm. The diameter of nickel particles is measured from a photomicrograph under a scanning or transmission electron microscope (SEM or TEM) although the laser diffraction and other methods may be employed as well. The preferred shape of nickel particles is spherical. This may be expressed in terms of a bulk density, tap density or compression density. It is preferred that surfaces of nickel particles be at least partially coated with nickel oxide. More desirably, at least 50% of the nickel particle surface is coated with nickel oxide. Nickel oxide is observable in a TEM photomicrograph. The method of coating nickel particle surfaces with nickel oxide is by heat treating nickel particles in an inert gas atmosphere (e.g., $N_2$, Ar) at a temperature of 200 to 550° C. for causing nickel to react with a trace of oxygen in the atmosphere, thereby forming a nickel oxide coating.

The particulate mixture of the invention is obtained by admixing complex oxide fine particles with nickel particles such that the nickel particles are covered with the complex oxide fine particles. The presence of complex oxide $ABO_3$ on nickel particle surface serves to prevent adjacent nickel particles from direct contact for restraining shrinkage or shifting the incipient shrinkage temperature. Ideally, it is desired that the nickel particle surface be entirely and continuously covered with complex oxide fine particles. For the entire and continuous coverage, the nickel particle surface is most desirably covered with a full coat of complex oxide. However, it is difficult that the nickel particle surface is entirely and continuously covered with fine particles of complex oxide $ABO_3$ or a full coat thereof. The minimum requirement that at least part of the nickel particle surface be covered with fine particles of complex oxide $ABO_3$ is sufficient to restrain shrinkage or to shift the incipient shrinkage temperature. To this end, fine particles of complex oxide $ABO_3$ are admixed with nickel particles in an amount of 5 to 30% by weight and desirably 15 to 25% by weight, based on the entire weight of the particulate mixture. Less than 5 wt % of complex oxide fine particles is less effective for restraining a shrinkage factor whereas more than 30 wt % is effective for restraining a shrinkage factor, but raises a problem of electric resistance. The content of complex oxide $ABO_3$ may be determined by dissolving the particulate mixture in an acid such as hydrochloric acid and measuring the concentration of $ABO_3$ by inductively coupled plasma (ICP) spectrometry or the like.

In another preferred embodiment, silver particles having a particle size distribution of up to 0.5 μm, preferably 0.01 to 0.1 μm are further admixed in the particulate mixture in an amount of from 0.01% by weight to 10% by weight, preferably up to 5% by weight, and more preferably 0.5 to 4% by weight, based on the entire weight of the particulate mixture. When electronic parts such as ceramic capacitors are manufactured, they are typically fired in an inert or weakly reducing atmosphere in order to prevent oxidation of nickel. Silver is not oxidized even in an oxidizing atmosphere. The inclusion of silver helps prevent oxidation of nickel.

As described above, the presence of fine particles of complex oxide $ABO_3$ on nickel particle surface serves to prevent adjacent nickel particles from direct contact for restraining shrinkage and/or shifting the incipient shrinkage temperature. In order that nickel particles be covered with complex oxide fine particles, it is necessary that the diameter D of complex oxide fine particles be fully smaller than the diameter d of nickel particles. It is recommended that the ratio (D/d) of the diameter D of complex oxide fine particles to the diameter d of nickel particles fall in the range between 0.001 and 0.3. Better results are obtained at a lower ratio D/d, with D/d≦0.05 being most preferred.

The particulate mixture composed mainly of nickel particles and fine particles of complex oxide $ABO_3$ is desirably in an intimately mixed state. It is preferred that nickel particle surfaces do not have complex oxide fine particles agglomerated, but be covered with primary particles. More preferably, the nickel particle surface is entirely covered with primary particles of complex oxide as if the nickel particle were covered with a coat of primary particles. The mixed state and coverage state of nickel particles with complex oxide fine particles may be determined by SEM or TEM photomicrography, EPMA, Auger or the like, although XPS analysis is advantageous because of ease of quantification. Both the particles are preferably mixed in such a state that when the powder is analyzed by XPS, the concentration of element A at a depth of 5 nm from the surface is at least twice, more preferably at least 2.5 times the concentration of element A at a depth of 100 nm from the surface. The upper limit is not critical although the concentration of element A at a depth of 5 nm from the surface is higher than the concentration of element A at a depth of 100 nm from the surface usually by a fold of 20 or less, especially 10 or less.

The method of mixing complex oxide fine particles, nickel particles and optional silver particles is not particularly limited as long as they are uniformly mixed. For example, while a slurry of complex oxide fine particles is being dispersed by a homomixer, nickel particles and optional silver particles are added; and the mixture is mixed in a kneader.

Paste

The particulate mixture of the invention is advantageously used as an electrode material. Preferably it is used in the form of an electroconductive paste which is prepared from the particulate mixture and an organic vehicle. The conductive paste is preferably composed of 50 to 85% by weight of the particulate mixture and the balance of organic vehicle.

The organic vehicle comprises an organic or inorganic binder, a dispersant/plasticizer and a diluent. Specifically, binders including cellulose resins such as ethyl cellulose and hydroxypropyl cellulose, polyvinyl butyral, and acrylic resins are used in an amount of 5 to 20% by weight; dispersants/plasticizers including dibutyl phthalate are used in an amount of 5% by weight or less, especially 1 to 3% by weight; and the balance is composed of diluents including unsaturated alcohols such as terpineol and ethers such as 2-methoxyethanol. The organic vehicle may have a viscosity of about 5 to 25 Pa·s at 25° C.

The conductive paste can be routinely printed on a desired substrate, for example, of an oxide-base ceramic material, typically alumina, by screen printing or the like, burned out in air at 300 to 500° C., and sintered in a reducing atmosphere at 1,150 to 1,350° C. for 2 to 6 hours, thereby forming a conductive film (electrode). The thickness of the conductive film is adjustable by selecting the opening of the screen and the viscosity of the paste, for example. After the resulting electrode is sintered under ceramic sintering conditions, there is obtained a conductive film having a sheet resistance of up to 100 mΩ.

Using the complex oxide fine particles or particulate mixture of the invention as an electrode material for internal electrode layers, the shrinkage behavior of internal electrode layers during sintering is improved.

EXAMPLE

Examples of the invention are given below by way of illustration and not by way of limitation. TEM is transmission electron microscope.

Examples 1–10

Water-soluble salts of metals other than barium such as a titanium chloride solution, a rare earth nitrate solution and a manganese chloride solution were combined so as to give the ratio and concentration shown in Table 1. Urea was added to the mixed solution, which was heated at 90° C. to form a metal hydroxide such as titanium/rare earth/manganese hydroxide as a precipitate. It was collected by filtration and thoroughly washed with water. The hydroxide thus obtained was dispersed in dilute nitric acid to form a slurry. A predetermined amount of barium hydroxide in powder form was weighed and added to the slurry. The preparation was adjusted so that the slurry had a titanium concentration of at least 0.5 mol/L and a molar ratio Ba/Ti between 1.01 and 1.2.

Figure 2:
FIG. 2 is a photomicrograph of complex oxide fine particles of Example 6.

The slurry was heated at a temperature between 130° C. and 200° C. and held at the temperature over 30 minutes, yielding complex oxide fine particles having a cubic or pseudo-cubic crystalline structure and represented by the formula $ABO_3$ wherein A is at least one element selected from among alkaline earth metal elements and rare earth elements and B is at least one metal selected from among Ti, Mn, Nb and Zr, as shown in Tables 1 and 2. The precipitate was filtered, washed with water and dried. The powder thus obtained was determined for composition by ICP spectrometry, B/A ratio by x-ray fluorescence analysis, crystalline structure by x-ray diffraction, and specific surface area by the BET method. Particles were observed by TEM photomicrography. FIGS. 1 and 2 are photomicrographs of particles of Examples 2 and 6, respectively. The agglomerate particle diameter was measured by the laser diffraction method (SALD-7000 by Shimadzu Mfg. Co., Ltd., refractive index 2.40–0.05). The DSC endothermic quantity was measured by a low-temperature differential scanning calorimeter. The preparation conditions and measurement results are shown in Tables 1 and 2.

Comparative Example 1

Figure 3:
FIG. 3 is a photomicrograph of complex oxide fine particles of Comparative Example 1.

Predetermined amounts of a titanium chloride solution (16.5 wt %), barium chloride dihydrate and deionized water were weighed. The titanium chloride solution and barium chloride dihydrate were dissolved in deionized water to form 20 liters of a solution having a Ti-Ba concentration of 0.05 mol/L. Aqueous ammonia (28 wt %, 350 g) was added to the solution to form a slurry. The slurry was heated at a temperature between 130° C. and 200° C. and held at the temperature over 30 minutes, yielding barium titanate fine particles. The precipitate was filtered, washed with water and dried. The powder thus obtained was determined for composition by ICP spectrometry, B/A ratio by x-ray fluorescence analysis, crystalline structure by x-ray diffraction, and specific surface area by the BET method. Primary particles were observed by TEM photomicrography. FIG. 3 is a photomicrograph of particles of Comparative Example 1. The agglomerate particle diameter was measured by the laser diffraction method (SALD-7000 by Shimadzu Mfg. Co., Ltd., refractive index 2.40–0.05). The preparation conditions and measurement results are shown in Tables 1 and 2.

TABLE 1

| | Composition | | Charge A/B (molar ratio) | Concentration (mol/L) | Heating time (min) | Holding time (min) | BET ($m^2/g$) | Product A/B (molar ratio) |
|---|---|---|---|---|---|---|---|---|
| | Elements | Molar ratio | | | | | | |
| Example 1 | Ba:Sr:Ti = | 2000:1:2000 | 1.09 | 0.5 | 40 | 60 | 22 | 1.005 |
| Example 2 | Ba:Sr:Ti:Zr = | 1000:1:2000:1 | 1.08 | 0.8 | 120 | 40 | 28 | 1.003 |
| Example 3 | Ba:Sr:Mg:Ti = | 2000:1:1:2000 | 1.05 | 1.2 | 30 | 60 | 50 | 1.004 |
| Example 4 | Ba:Sr:Ti:Mn = | 2000:1:2000:1 | 1.08 | 0.7 | 60 | 60 | 36 | 1.005 |
| Example 5 | Ba:Sr:Y:Ti = | 2000:1:10:2000 | 1.08 | 0.8 | 150 | 60 | 29 | 1.002 |
| Example 6 | Ba:Sr:Y:Ti:Zr = | 2000:1:10:2000:1 | 1.05 | 0.8 | 60 | 60 | 49 | 0.997 |
| Example 7 | Ba:Sr:Y:Ti:Mn = | 1000:1:10:2000:1 | 1.08 | 0.8 | 40 | 40 | 42 | 0.999 |
| Example 8 | Ba:Sr:Gd:Ti:Zr = | 2000:1:10:2000:1 | 1.04 | 1.1 | 90 | 120 | 45 | 0.998 |
| Example 9 | Ba:Sr:Dy:Ti = | 2000:1:10:2000 | 1.10 | 0.5 | 90 | 150 | 25 | 1.01 |
| Example 10 | Ba:Sr:Ho:Ti:Nb = | 2000:1:10:2000:2 | 1.05 | 1.5 | 40 | 40 | 58 | 1.005 |
| Comparative Example 1 | Ba:Ti = | 1:1 | 1.000 | 0.05 | 40 | 60 | 17 | 0.999 |

TABLE 2

| | Particle diameter | | | DSC (mcal/g) | X-ray diffraction |
|---|---|---|---|---|---|
| | $D_{10}$ (μm) | $D_{50}$ (μm) | $D_{90}$ (μm) | | |
| Example 1 | 0.033 | 0.056 | 0.090 | 13 | pseudo-cubic or cubic crystals |
| Example 2 | 0.027 | 0.040 | 0.067 | 5 | pseudo-cubic or cubic crystals |
| Example 3 | 0.015 | 0.028 | 0.039 | 4 | pseudo-cubic or cubic crystals |
| Example 4 | 0.023 | 0.035 | 0.054 | 6 | pseudo-cubic or cubic crystals |
| Example 5 | 0.025 | 0.038 | 0.061 | 9 | pseudo-cubic or cubic crystals |
| Example 6 | 0.019 | 0.031 | 0.043 | 4 | pseudo-cubic or cubic crystals |
| Example 7 | 0.023 | 0.037 | 0.049 | 5 | pseudo-cubic or cubic crystals |
| Example 8 | 0.021 | 0.033 | 0.045 | 5 | pseudo-cubic or cubic crystals |
| Example 9 | 0.033 | 0.050 | 0.074 | 11 | pseudo-cubic or cubic crystals |
| Example 10 | 0.010 | 0.021 | 0.033 | 3 | pseudo-cubic or cubic crystals |
| Comparative Example 1 | 0.081 | 0.134 | 0.229 | 13 | pseudo-cubic or cubic crystals |

A comparison is made of Examples 1 to 10 with Comparative Example 1. The particles of Examples 1 to 10 have a BET specific surface area as large as 20 to 70 $m^2/g$, from which the diameter of primary particles is computed as small as 0.007 to 0.025 μm. A direct observation by TEM photomicrograph also reveals that primary particles have a diameter of 0.01 to 0.04 μm, which is substantially coincident with the diameter computed from the BET specific surface area. The average particle diameter $D_{50}$ as determined from particle size distribution (by laser diffraction) is 0.02 to 0.06 μm, approximate to the primary particle diameter, indicating that the powder is weakly cohesive and is substantially monodisperse. The particles of Comparative Example 1 have a BET specific surface area of 17 $m^2/g$, from which primary particles are computed to have a slightly larger diameter of 0.03 μm. A direct observation by TEM photomicrograph also reveals that primary particles have a diameter of 0.01 to 0.1 μm. The average particle diameter $D_{50}$ as determined from particle size distribution (by laser diffraction) is 0.13 μm, approximate to the primary particle diameter of TEM photomicrograph, indicating a larger diameter.

Synthesis Example 1

Figure 4:
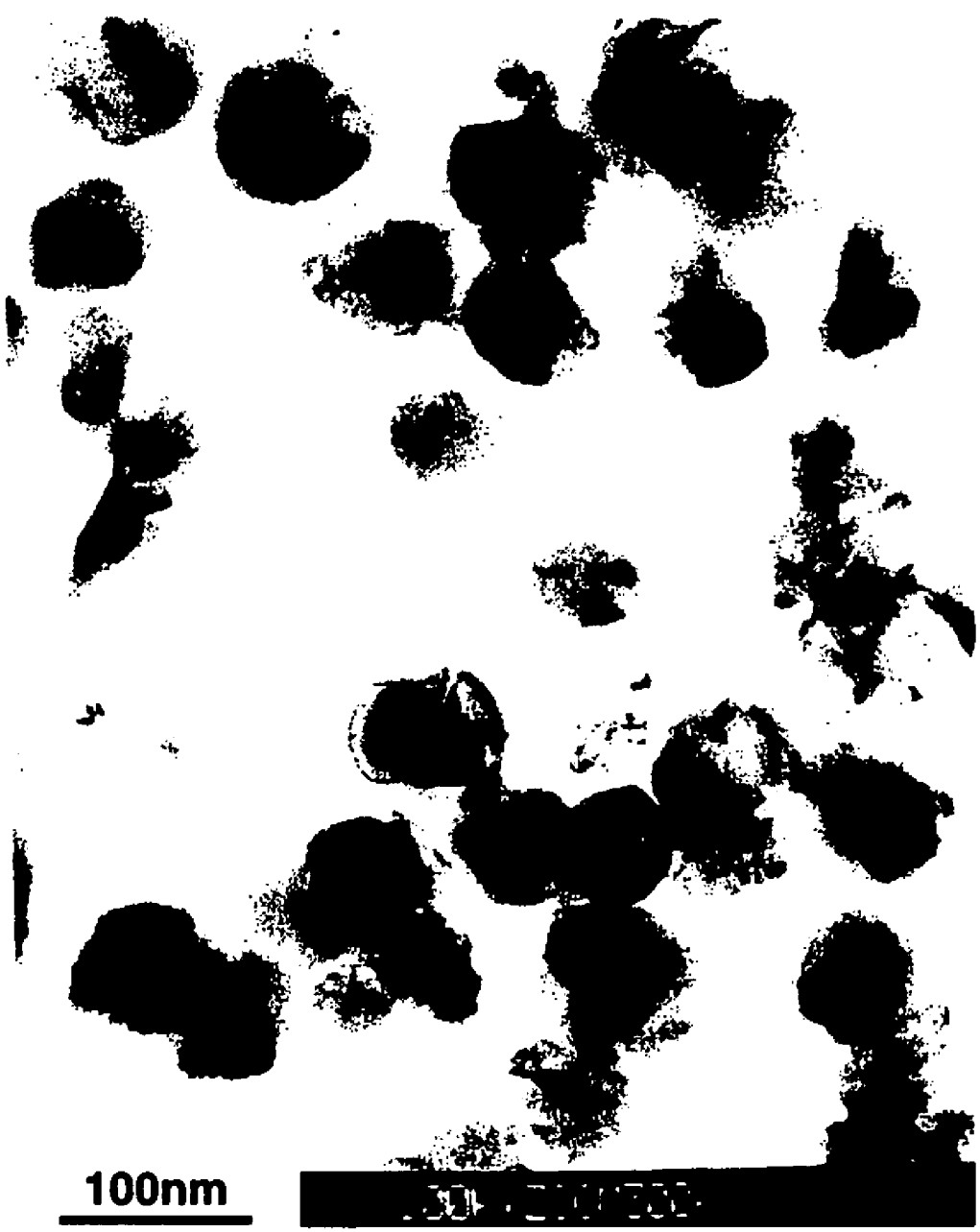
FIG. 4 is a photomicrograph of nickel particles of Synthesis Example 1.

There was furnished 1.5 liters of a nickel sulfate solution (1.0 mol/L). With stirring at room temperature, 50 g of trisodium phosphate dodecahydrate was added to 1.3 liters of a sodium hydroxide solution (12 mol/L). Thereafter, the nickel sulfate solution was added over about one hour. To the solution heated at 55° C., 1 liter of an aqueous hydrazine solution (60 wt %) was added within about 30 seconds. Reaction was effected for 20 minutes, followed by filtration and recovery. The recovered cake was washed with lauric acid in isopropyl alcohol whereby particle surfaces were coated with lauric acid. Then heat treatment was effected in an inert atmosphere (Ar) at 550° C. for 4 hours. The outer appearance of the resulting nickel particles was observed by TEM photomicrography as shown in FIG. 4.

Example 11

Figure 5:
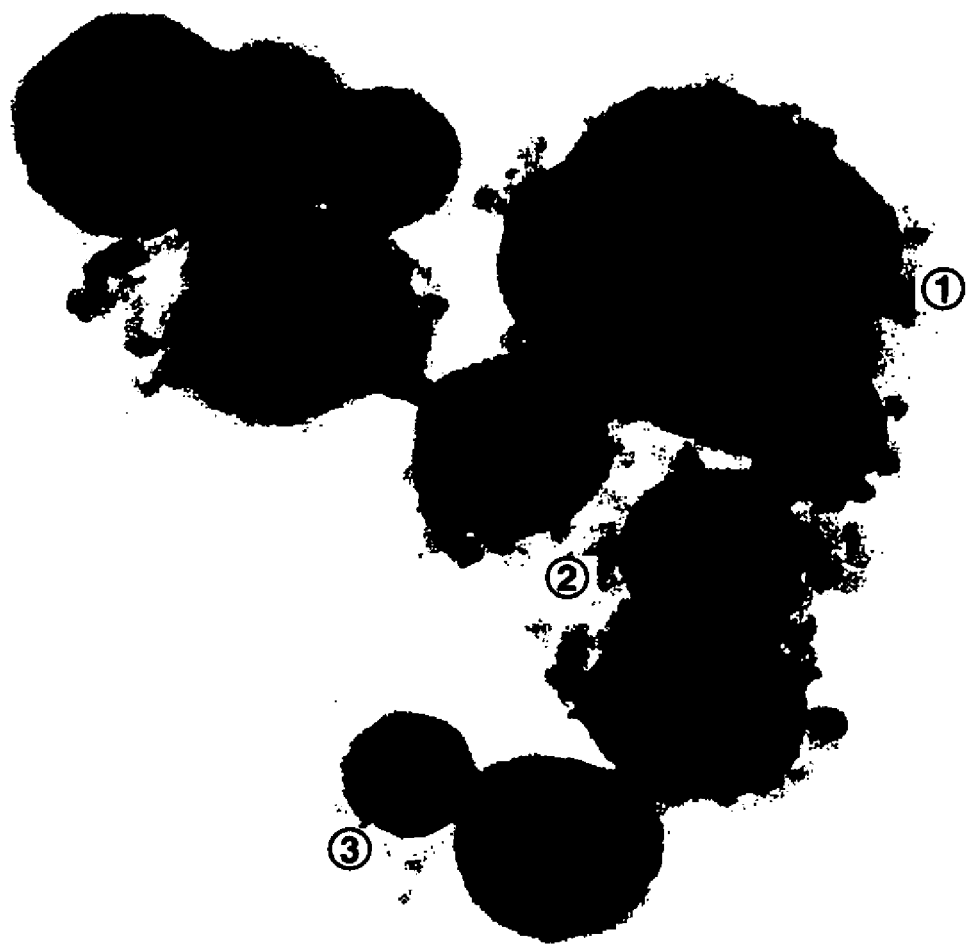
FIG. 5 is a photomicrograph of a particulate mixture of Example 11.
Figure 6:
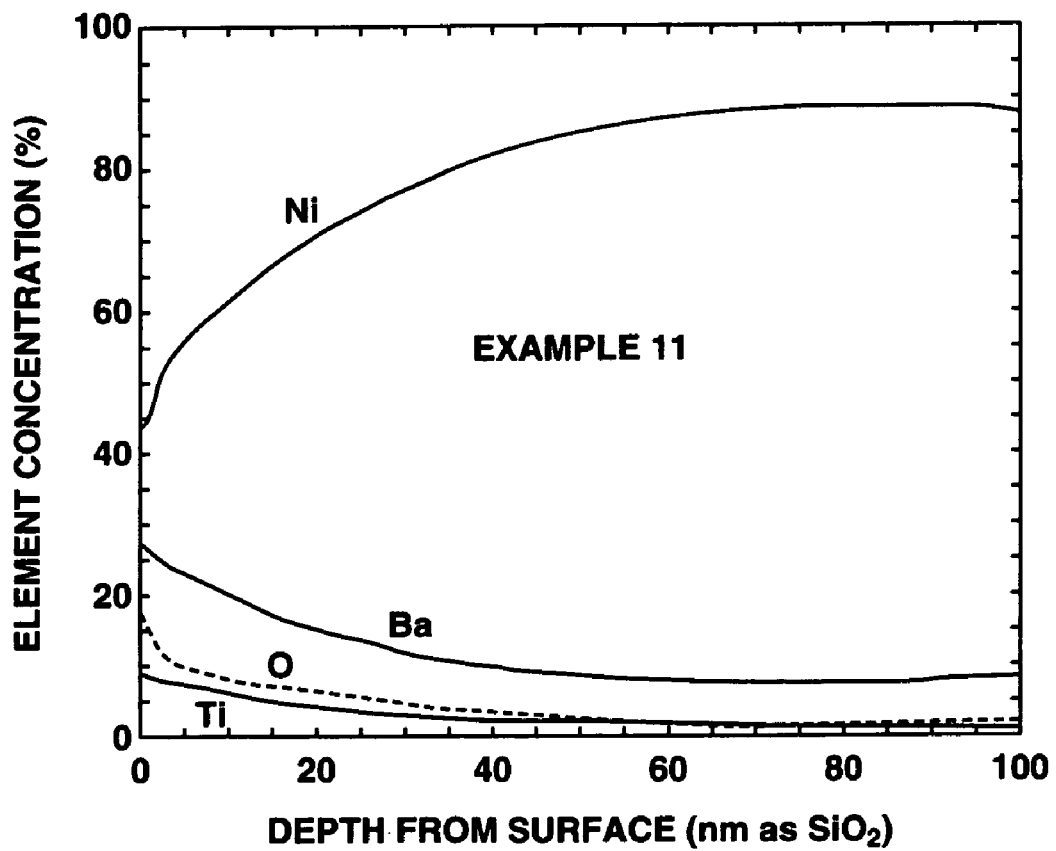
FIG. 6 is a concentration profile of the particulate mixture of Example 11 as analyzed depthwise by XPS.
Figure 7:
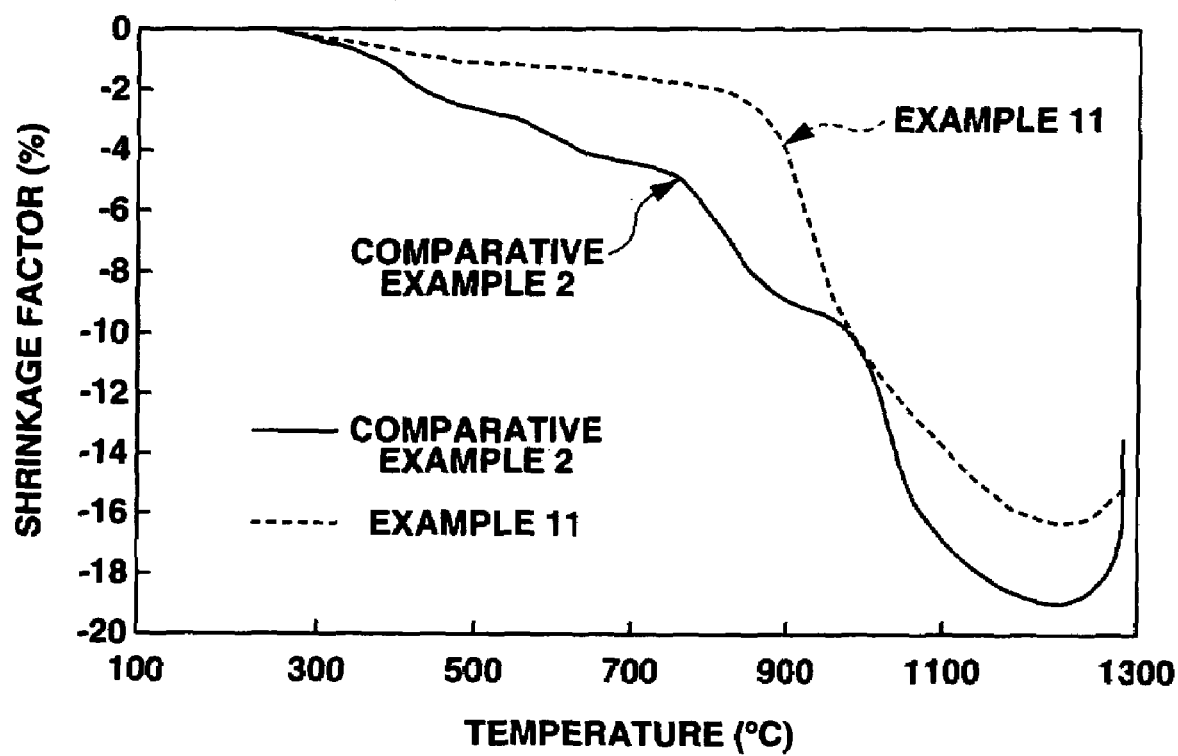
FIG. 7 is a TMA chart of the particulate mixtures of Example 11 and Comparative Example 2.

The complex oxide fine particles of Example 2 were weighed so as to provide a slurry concentration of 2% by weight, admitted into 20 kg of isopropyl alcohol, and dispersed for about 120 minutes by means of a homomixer (Tokushu Kika Kogyo K.K.). Next, the nickel particles of Synthesis Example 1 were weighed so as to provide a slurry concentration of 8% by weight, and admitted into the slurry which was continuously dispersed by the homomixer. The slurry was transferred to a kneader, which was operated to mix the slurry and evacuated to vacuum whereby the isopropyl alcohol was evaporated off in vacuum. There was obtained a mixed powder of nickel particles and complex oxide fine particles, a portion of which was dissolved in mixed acid to form a sample solution. The sample was analyzed for nickel and complex oxide contents by ICP, finding a nickel/complex oxide ratio=80/20 by weight, which was in accord with the ratio as charged. The powder was observed under TEM to take a photomicrograph, from which the ratio (D/d) of the diameter D of complex oxide fine particles to the diameter d of nickel particles was determined. FIG. 5 is a photomicrograph of the powder, with D/d=about 0.2 to about 0.03. The powder was also analyzed by x-ray photoelectron spectroscopy (XPS). The result of XPS is shown in FIG. 6. Furthermore, the dry powder was press molded in a mold (diameter 30 mm) under 300 kg/cm$^2$ to form several compacts. While flowing $N_2+H_2$ (3 wt %), thermomechanical analysis (TMA) was performed on the compacts to determine a shrinkage factor. The results of TMA are shown in FIG. 7.

Terpineol and ethyl cellulose (EC) were combined to give an organic solvent consisting of 92 wt % terpineol and 8 wt % EC. The organic solvent was mixed with the particulate mixture of Example 11 in a proportion of 50 wt % and 50 wt % to form a paste. The viscosity of the paste was measured by a Brookfield viscometer, finding a viscosity of 10,000 cps (10 Pa·s). Using a screen printing machine, the paste was printed on an alumina substrate through a 250-mesh screen. The printed film was burned out in air at 400° C. for one hour, and then sintered at 1,300° C. for 2 hours in a stream of $N_2+H_2$ (3 wt %). The sintered film had a thickness of 27 μm and a sheet resistivity of 30 mΩ/square.

Comparative Example 2

Figure 8:
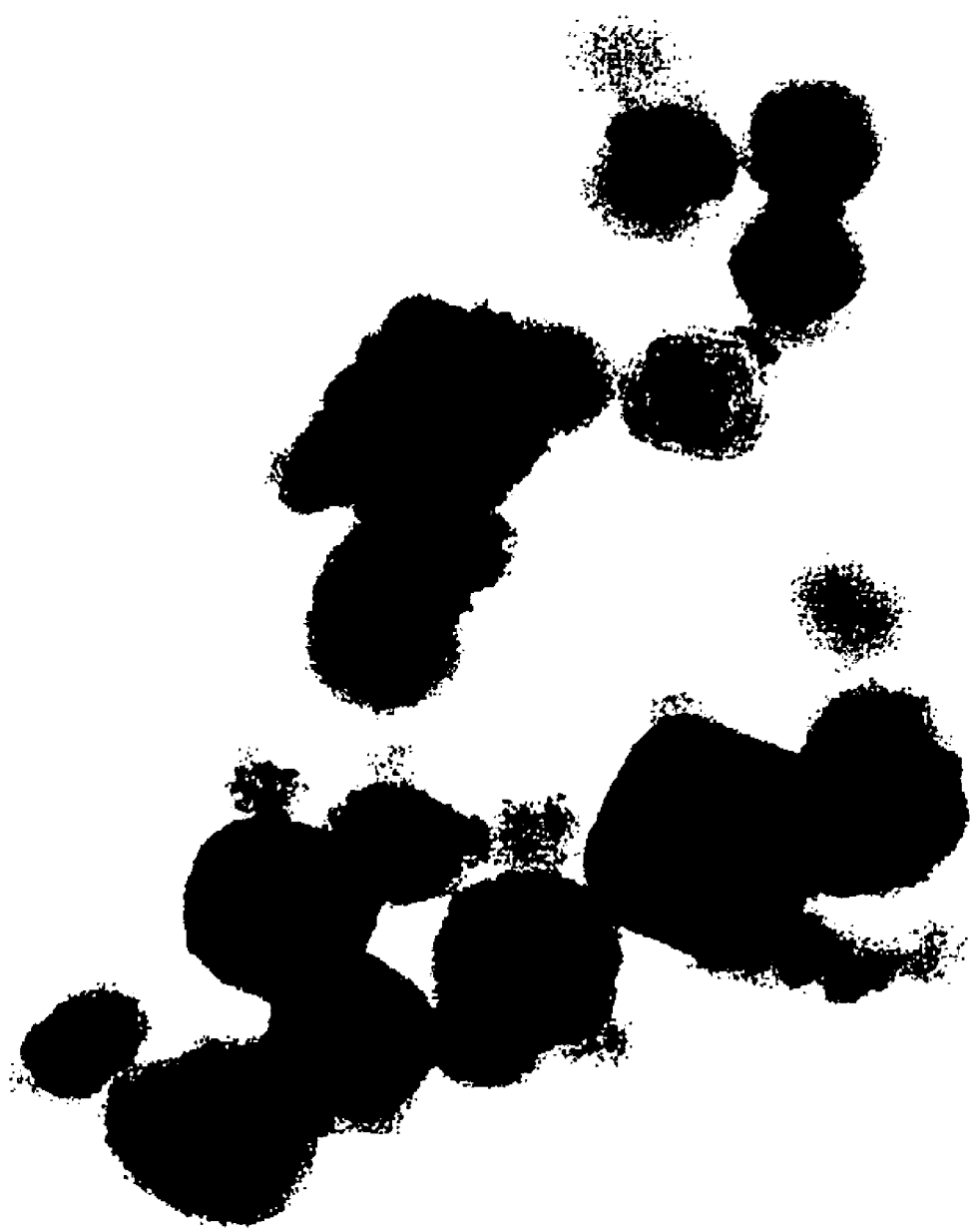
FIG. 8 is a photomicrograph of a particulate mixture of Comparative Example 2.

Like Example 11 above, the complex oxide fine particles of Example 2 were weighed so as to provide a slurry concentration of 2% by weight, admitted into 20 kg of isopropyl alcohol, and dispersed for about 120 minutes by means of a homomixer (Tokushu Kika Kogyo K.K.). Next, nickel particles (Kawatetsu Mining Co. Ltd., trade name NFP201) were weighed so as to provide a slurry concentration of 8% by weight, and admitted into the slurry which was continuously dispersed by the homomixer. The slurry was transferred to a kneader, which was operated to mix the slurry and evacuated to vacuum whereby the isopropyl alcohol was evaporated off in vacuum. There was obtained a mixed powder of nickel particles and complex oxide fine particles, a portion of which was dissolved in mixed acid to form a sample solution. The sample was analyzed for nickel and complex oxide contents by ICP, finding a nickel/complex oxide ratio=80/20 by weight, which was in accord with the ratio as charged. The powder was observed under TEM to take a photomicrograph, from which the ratio (D/d) of the diameter D of complex oxide fine particles to the diameter d of nickel particles was determined. FIG. 8 is a photomicrograph of the powder. The powder was also analyzed by XPS, with the result shown in FIG. 7. Furthermore, the dry powder was press molded in a mold (diameter 30 mm) under 300 kg/cm$^2$ to form several compacts. While flowing $N_2+H_2$ (3 wt %), TMA was performed on the compacts to determine a shrinkage factor. The results of TMA are shown in FIG. 9.

A comparison is made of Example 11 with Comparative Example 2. As seen from the TEM photomicrograph (FIG. 5) of the powder of Example 11, the ratio (D/d) of the diameter D of complex oxide fine particles to the diameter d of nickel particles is from about 0.2 to about 0.03, indicating that fine particles of complex oxide are deposited on surfaces of nickel particles. It is also seen that some complex oxide fine particles cover at least portions of the nickel particle surface. In the state that nickel particles are partially covered with complex oxide fine particles which are fully small relative to the nickel particles, the barium concentration as analyzed by XPS in proximity to the surface (specifically, the barium concentration at a depth of 5 nm from the surface) is higher than the barium concentration at a deep position (specifically, the barium concentration at a depth of 100 nm from the surface). Specifically, the barium concentration at a depth of 5 nm from the surface is at least twice the barium concentration at a depth of 100 nm from the surface. In the powder of Comparative Example 2, some complex oxide fine particles have an equivalent size to nickel particles as seen from the TEM photomicrograph (FIG. 8). In the state that complex oxide fine particles are not so small relative to nickel particles, the barium concentration as analyzed by XPS at a depth of 5 nm from the surface is close to the barium concentration at a depth of 100 nm from the surface.

A comparison is made in TMA between Example 11 and Comparative Example 2. The temperature at which Example 11 undergoes substantial shrinkage is higher than that of Comparative Example 2. Also Example 11 has a low shrinkage factor at about 1,280° C. This demonstrates that the problem of differential shrinkage behavior between internal electrode layers and dielectric layers is solved when complex oxide fine particles represented by the general formula: $ABO_3$ and having a BET specific surface area of 20 to 70 m$^2$/g and a DSC endothermic quantity of up to 20 mcal/g are mixed with nickel particles whose surface is at least partially coated with nickel oxide, in an amount of 5 to 30% by weight of the resulting mixture, preferably such that on XPS analysis, the concentration of element A at a depth of 5 nm from the surface is at least twice the concentration of element A at a depth of 100 nm from the surface.

Japanese Patent Application No. 2003-062755 is incorporated herein by reference.

The invention has been described in detail with particular reference to preferred embodiments thereof, but it will be understood by those skilled in the art that variations and modifications can be effected within the spirit and scope of the invention.

The invention claimed is:

1. A particulate mixture comprising:
   nickel particles having surfaces which are at least partially coated with nickel oxide and having a particle size distribution of 0.05 to 1.0 μm and
   5 to 30% by weight, based on the mixture, of complex oxide fine particles represented by the general formula: $ABO_3$ wherein A is at least two elements selected from alkaline earth metal elements and rare earth elements and B is at least one metal selected from the group consisting of Ti, Mn, Nb and Zr, and having a BET specific surface area of 20 to 70 m²/g and a DSC endothermic quantity of up to 20 mcal/g which are uniformly admixed with the nickel particles so as to cover at least partially the nickel particle surfaces.

2. The particulate mixture of claim 1, further comprising 0.01 to 10% by weight, based on the mixture, of silver particles having a particle size distribution of up to 0.5 μm.

3. The particulate mixture of claim 1 wherein the nickel particles are admixed and covered with the complex oxide fine particles such that when the particulate mixture is analyzed by XPS, the concentration of element A at a depth of 5 nm from the surface is at least twice the concentration of element A at a depth of 100 nm from the surface.

4. The particulate mixture of claim 1 wherein the nickel particles and the complex oxide fine particles have an average particle diameter d and D, respectively, when observed under a transmission electron microscope, and the ratio D/d is in a range between 0.001 and 0.3.

5. The particulate mixture of claim 1 wherein the complex oxide has the formula: $(Ba.E)(Ti.Zr.Mn)O_3$.

6. The particulate mixture of claim 1 wherein the complex oxide fine particles have a BET specific surface area of 25 to 50 m²/g.

7. The particulate mixture of claim 1 wherein the complex oxide fine particles have an endothermic quantity of up to 15 mcal/g, as determined by differential scanning calorimetry at a temperature within the range of from about 120 to about 140° C.

8. An electroconductive paste comprising the particulate mixture of claim 1 and an organic vehicle.

9. The electroconductive paste of claim 8 comprising from 50 to 85% by weight of the particulate mixture and the balance being the organic vehicle.

10. The electroconductive paste of claim 8 wherein the organic vehicle comprises an organic or inorganic binder; a dispersant; a plasticizer and a diluent.

11. The electroconductive paste of claim 10 wherein the binder is selected from the group consisting of: ethyl cellulose; hydroxypropyl cellulose; polyvinyl butyral; acrylic resins and mixtures thereof.

* * * * *